Dec. 10, 1963

C. FANSHIER 3,113,457

SLIP TUBE GAUGE

Filed Feb. 24, 1959

Inventor:
Chester Fanshier
By Wilmer Mechlin
his Attorney

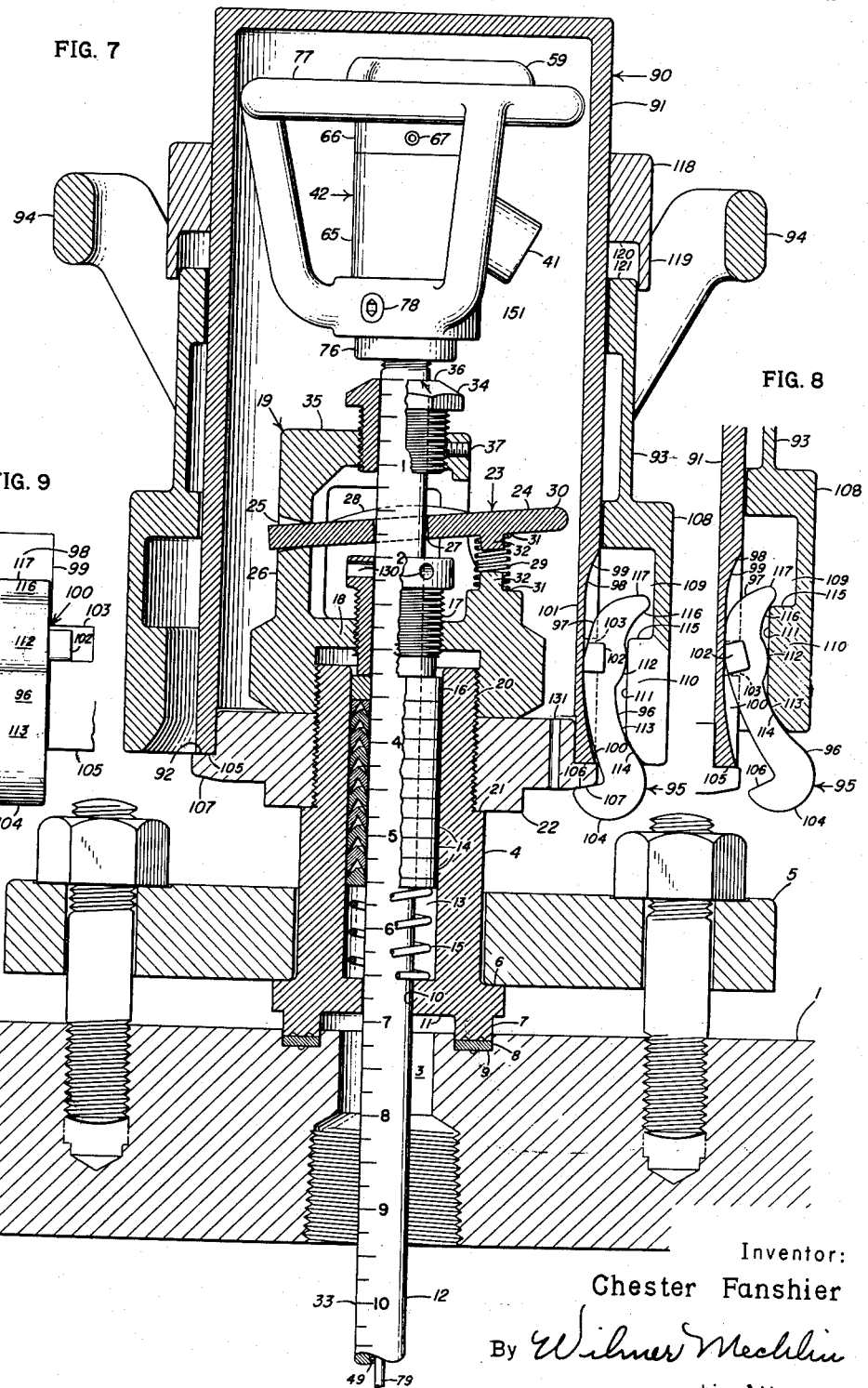

Dec. 10, 1963

C. FANSHIER 3,113,457

SLIP TUBE GAUGE

Filed Feb. 24, 1959

Inventor:
Chester Fanshier
By Wilmer Mechlin
his Attorney

Dec. 10, 1963

C. FANSHIER 3,113,457

SLIP TUBE GAUGE

Filed Feb. 24, 1959

Inventor:
Chester Fanshier
By Wilmer Mechlin
his Attorney

United States Patent Office 3,113,457
Patented Dec. 10, 1963

3,113,457
SLIP TUBE GAUGE
Chester Fanshier, P.O. Box 676, Bartlesville, Okla.
Filed Feb. 24, 1959, Ser. No. 795,045
23 Claims. (Cl. 73—298)

This invention relates to liquid level gauges and has for its primary object the provision of an improved liquid level gauge of the slip tube type for determining the level of liquid under pressure in a tank or other vessel.

Widely used in gauging the level and thus the quantity, in a stationary or movable tank, of voltaile hydrocarbons or other fluids which are shipped or stored under pressure in liquified from, liquid level gauges of the slip tube type use a hollow tube projecting from and slidable vertically in the tank through which gas can escape to the point at which an inlet in the lower part of the tube is fully immersed in the liquid. Suitably graduated for the particular installation, the axial position of the tube at that point relative to an external pointer fixes the level of the liquid. While sound in theory, such gauging poses problems, particularly in high pressure installations, in preventing accidental escape of gas, controlling both the escape of the gas and its tendency forcibly to eject the tube during gauging, and protecting the gauge against damage and accidental operation when not in use without hindrance to its use in gauging.

An object of the invention is to provide an improved slip tube liquid level gauge by which the foregoing problems are effectively elminated.

Another object of the invention is to provide an improved slip tube gauge wherein flow through the tube is regulated during gauging and at other times prevented by a pair of coacting control and check valves.

An additional object of the invention is to provide a slip tube gauge in which the pair of control and check valves associated with the tube are so interrelated as normally to provide a double seal against accidental escape of fluid through the tube, with the check valve remaining operative as a safety seal either during removal of the control valve for repair or replacement or on accidental breaking off of the portion of the tube projecting above the tank.

A further object of the invention is to provide a slip tube gauge wherein the pair of control and check valves are so arranged and constructed that the check valve is operatively responsive to and opens and closes intermediate opening and closing of the control valve, any back pressure which might otherwise interfere with closing of the check valve thus being bled automatically through the control valve.

Another object of the invention is to provide a slip tube gauge the operating parts of which normally are covered and protected by a housing which, while effectively locked against accidental dislodgement when in housing position, is automatically lockable and releasable merely by application to it of the appropriate vertical force.

An additional object of the invention is to provide a slip tube gauge of the character just described wherein the housing, while automatically lockable and releasable under the appropriate vertical force, may readily be rendered proof against tampering when in housing position.

A further object of the invention is to provide a slip tube gauge which is so mountable on a tank or other vessel to which it is applied as to minimize the cost of rendering it non-corrosive.

Another object of the invention is to provide an improved slip tube gauge whereby any undesirable escape of fluid either through or about the tube is effectively prevented.

An additional object of the invention is to provide an improved slip tube gauge which at installation may readily be adjusted to compensate for manufacturing tolerances in its parts or small inaccuracies in tank dimensions.

A further object of the invention is to provide an improved slip tube gauge having a tube latch of such arrangement and construction as to be of maximum effectiveness in locking the tube against undesired upward movement.

Other objects and advantages of the invention will appear hereinafter in the detailed description, be particularly pointed out in the appended claims and be illustrated in the accompanying drawings, in which:

FIGURE 7 is a fragmentary elevational view on an enlarged scale of the gauge of FIGURE 1, with portions broken away and shown in central section to more clearly illustrate certain of the details of construction;

FIGURE 8 is a fragmentary view in corresponding section of the locking dog of FIGURE 7 in released position;

FIGURE 9 is an end elevational view of the locking dog of FIGURE 7;

FIGURE 15 is a horizontal sectional view taken along the lines 15—15 of FIGURE 10;

Figure 1:
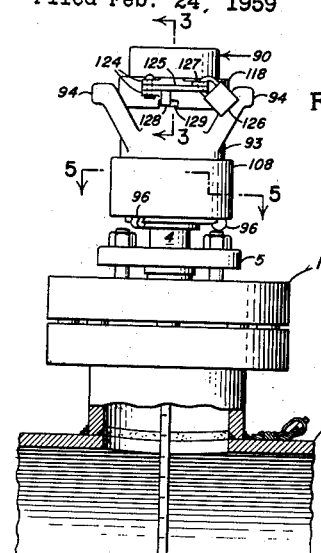
FIGURE 1 is a side elevational view of a preferred embodiment of the slip tube gauge of the present invention applied to a tank, with portions of the tank broken away and shown in section to more clearly illustrate certain of the details of construction.
Figure 3:
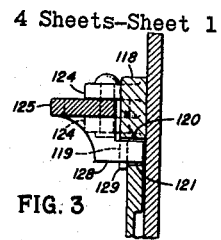
FIGURE 3 is a fragmentary vertical sectional view on an enlarged scale taken along the lines 3—3 of FIGURE 1.
Figure 2:
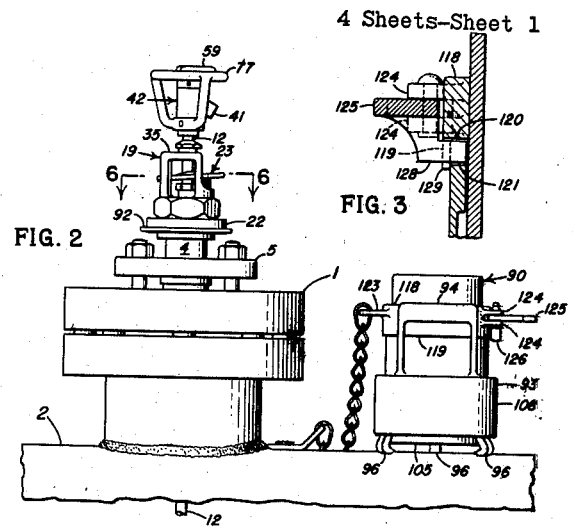
FIGURE 2 is a side elevational view of the gauge of FIGURE 1 with its housing removed.
Figure 4:
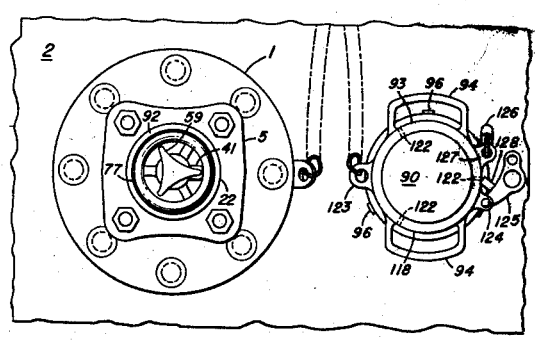
FIGURE 4 is a plan view of the structure of FIGURE 2.
Figures 5, 6:
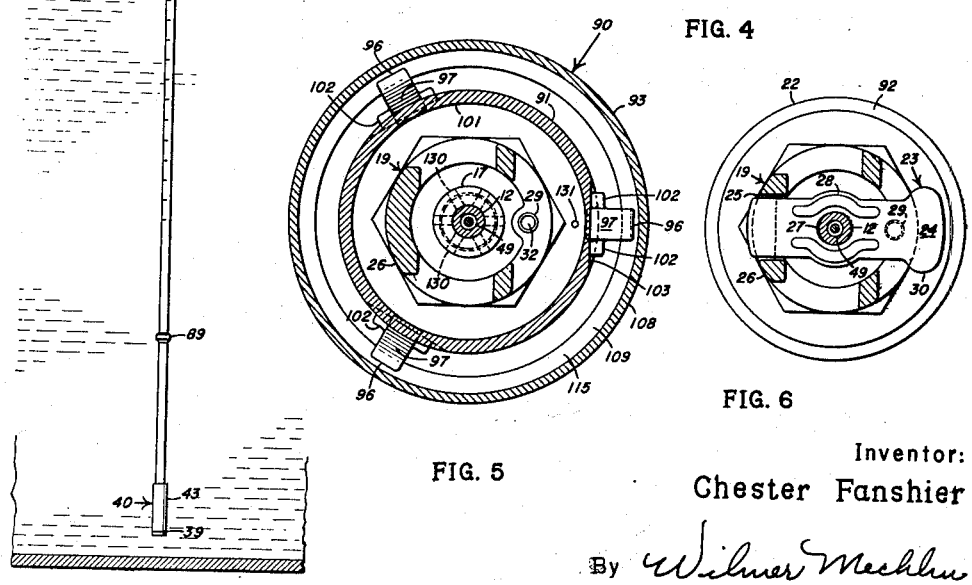
FIGURE 5 is a horizontal sectional view on an enlarged scale taken along the lines 5—5 of FIGURE 1.
FIGURE 6 is a horizontal sectional view on an enlarged scale taken along the lines 6—6 of FIGURE 2.
Figure 10:
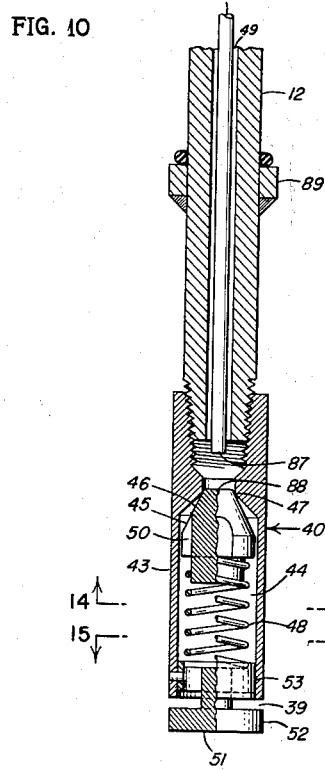
FIGURE 10 is a vertical sectional view on an enlarged scale of the tube assembly of the gauge.
Figure 14:
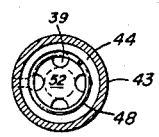
FIGURE 14 is a horizontal sectional view taken along the lines 14—14 of FIGURE 10.
Figure 11:
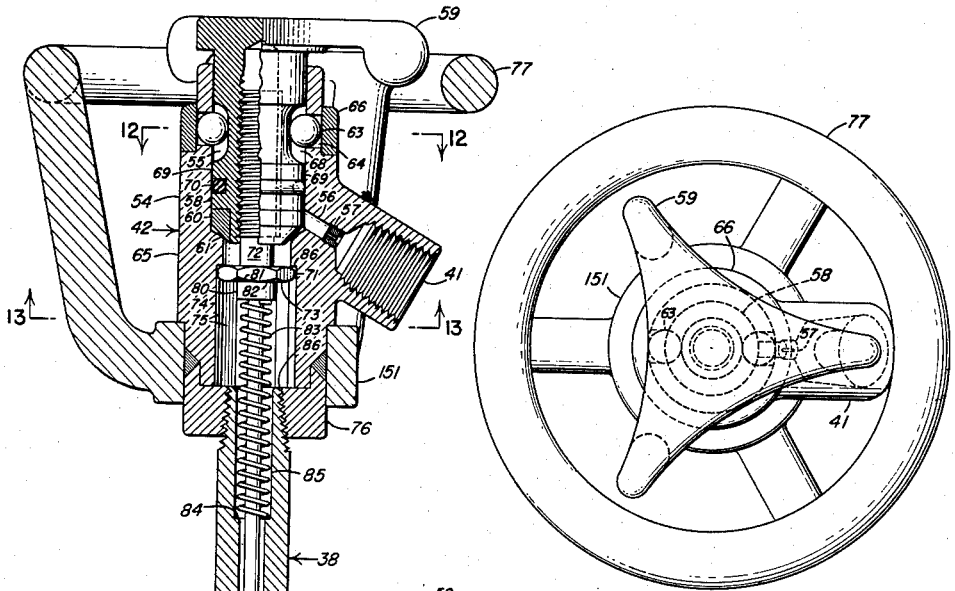
FIGURE 11 is a plan view of the assembly of FIGURE 10.
Figure 12:
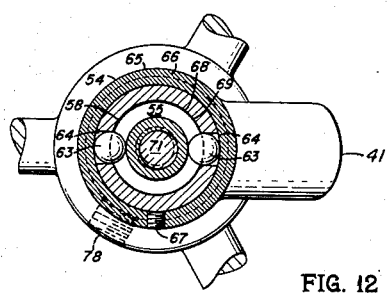
FIGURE 12 is a horizontal sectional view taken along the lines 12—12 of FIGURE 10.
Figure 13:
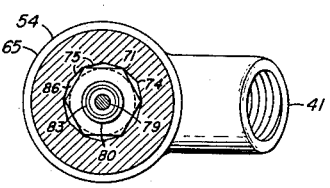
FIGURE 13 is a horizontal sectional view taken along the lines 13—13 of FIGURE 10.

Referring now in detail to the drawings, in which like reference characters designate like parts, the improved slip tube liquid level gauge of the present invention is adapted, by determining the liquid level, to measure the quantity of liquid in a tank car or other movable or fixed tank or container vessel in which hydrocarbons or other fluids are shipped or stored under pressure in liquid form.

Mounted on a fitting or platform 1 suitably provided on the pressure tank 2 and having a vertically directed passage or opening 3 opening onto the interior of the tank, the improved gauge is comprised of a body or base 4 which may be adapted to be screwed into the fitting 1 or attached thereto through an integral flange, but preferably is clamped to the fitting by a separate mounting plate or flange 5 loosely encircling the body and bolted or otherwise releasably attached to the fitting, the separateness of the mounting plate having advantage, not only in standardization but, in corrosive installations, in enabling the mounting plate separately to be rendered non-corrosive, as by galvanizing, with consequent reduction in the amount of non-corrosive metal required in and thus the expense of the whole gauge. Clamped to the fitting 1 by the downward pressure of the mounting plate 5 against an integral annular shoulder 6, the illustrated body 4 has a depending annular tongue 7 seating against a sealing gasket 8 in a correspondingly configured groove 9 formed in the fitting about the upper end of the passage 3.

The body 4 has a bore 10 in its bottom wall 11 through which slides a hollow slip tube 12 suitably graduated for the tank 2 on which the gauge is installed. Above its bottom wall 11, the body 4 has an upwardly opening cavity 13 serving as a stuffing box and containing about the tube a packing preferably in the form of a plurality of interfitting chevron-shaped rings 14 of "Teflon" or like resilient sealing material pressed upwardly by a spring 15 in the lower part of the cavity against a rigid packing gland 16 which, to adjust the pressure on the packing, is adjustable in axial position by a packing nut 17 threaded into a cross wall 18 of a cage 19 encircling and threaded onto the externally threaded upper end portion 20 of the body 4. Also encircling and threadedly engaging the upper end portion of the body and clamped thereto intermediate or between the cage 19 and an upwardly facing abutment 21 defining the lower extremity of the upper end portion is a support plate or disc 22, the purpose of which will hereafter be explained.

Extending from within the tank 2 upwardly through the body 4 and the cage 19, the tube 12 is subjectable to a force, derived from the pressure in the tank, tending to drive it upwardly. To restrain the tube against upward movement under such force when the gauge is not in use without interfering with the latter's use in gauging, there is provided a tube latch 23 including a preferably generally flat lever 24 pivoted or fulcrummed at one end to the tank 2 or body 4, conveniently in an outwardly flaring slot 25 in the side wall 26 of the cage 19 and having intermediate its ends a substantially central, vertically directed hole 27, at the sides of which the lever preferably is reinforced by longitudinally extending ribbing 28. Passing the tube freely when the lever 24 is in substantially horizontal position, the hole 27 is of a size relative to the tube to enable its opposite edges to grip and lock the tube against axial movement, when the lever is tilted or obliquely disposed. To render the action of the latch 23 automatic in normally locking the tube 12 against upward movement, the lever 24 is normally levered or tilted upwardly about its fulcrum by resilient means, preferably in the form of a coil spring 29, which, instead of encircling the tube as in a conventional slip tube gauge, is shifted outwardly therefrom toward the free end 30 of the lever for increased leverage and acts upwardly on the lever adjacent that end between an upwardly facing spring seat 31 on a side of the cage 19 opposite the slot 25 and the confronting underface of the lever. Releasable by downward manual or foot pressure on its free end 30, the lever 24 is limited in its permissive movement under such pressure to stop in its substantially horizontal position in which the tube is free to be moved in either vertical direction, by stop or limiting means, here by end engagement of a pair of opposed, normally spaced pins or studs 32, one formed on or carried by the lever 24 and the other the cage 19, and together serving, as well, as positioning or centering means for the spring 29.

For reading the graduations or scale 33 on the tube 12 on a measurement of the liquid level in the tank 2 on which the gauge is installed, there is provided a pointer 34 which, like conventional pointers, is fixed in vertical position relative to the tank after installation. However, unlike such pointers, the illustrated pointer 34 is adjustable vertically for compensating at installation for small variations among ostensibly identical gauges or tanks due to manufacturing tolerances. To this end, the preferred pointer 34 is in the form of a hex- or like-headed nut slidably receiving the tube 12 and threaded into the upper end or top 35 of the cage 19. Having a sight edge 36 at the top for reading the scale 33 and adjustable vertically relative to the tank 2 by screwing it into or out of the cage by means of a suitable wrench (not shown), the nut 34, once adjusted is fixable in vertical position relative to the tank by a set screw 37.

Slidable, slippable or shiftable vertically relative to the pointer 34 on release of the tube latch 23, the tube 12 is part of a tube assembly 38 having, at or adjacent its lower end within the tank 2, an inlet or intake port, opening or slot 39 and associated check or lower valve 40 and, at or adjacent its opposite or upper end, an outlet port or opening 41 and an associated control or upper valve 42 for regulating flow therethrough. Of the two valves, the check or one-way valve 40 has a casing or body 43 which, for repair or replacement of parts, preferably is threaded onto the lower end of the tube 12. In the casing 43 is a downwardly opening valve chamber 44 in which rides or slides a check valve element 45 preferably having an upwardly tapering or frusto-conical nose portion 46 seatable in a suitably configured valve seat 47 and normally urged thereagainst by an upwardly acting coil spring 48 for blocking flow therethrough to the axial bore 49 of the tube 12, the valve element being grooved or notched circumferentially, as at 50, below its seat-engaging portion to facilitate flow of fluid past it when in open position. Since the inlet port 39 governs the accuracy with which the gauge can determine the liquid level, it preferably is side- rather than end-opening and determined in its vertical extent by the vertical spacing between the lower end of the casing and the head 51 of a necked plug 52, the body portion 53 of which is bored vertically for passage of fluid and contained in and partially closes the lower end of the valve chamber 44. Serving as the reactance for the spring 48, the plug 52 is pinned or otherwise suitably secured to the casing 43.

The second or control valve 42 has its body or casing 54 preferably threaded onto the upper end of the tube 12, also for ready repair or replacement of parts. The outlet or discharge port or opening 41 is formed in and to one side of the body 54 and preferably is internally threaded for connection, if desired, of a suitable sampling device (not shown) for collecting and sampling discharged fluid. The port 41 is connected to the vertically disposed cylindrical valve chamber 55 of the control valve 42 by an outlet passage 56 which, although not essential in the tube assembly 38 of this invention, may be restricted in its free cross-section by an axially orificed plug 57, in case corresponding limitation of fluid flow through the passage is desired.

In and projecting above the valve chamber 55 is the control valve's stem or element 58 which carries or has at its upper end above the body 53 an actuating handle 59 and, on its lower end, a rubber or like bevelled washer 60 seatable in a valve seat 61, facing upwardly or oppositely from the downwardly facing valve seat 47 of the check valve 40, and through which the valve chamber is connectable to the upper end of the axial bore 49 in the tube 12.

Rotatable and vertically shiftable in the valve chamber 55, the valve stem 58 is designed for shifting between fully opened and closed positions but to be stopped at the upper limit of this range without interfering with its subsequent rotation. To so limit the vertical movement of the valve stem 58 without interfering with its rotatability, antifriction limiting means are employed, preferably in the form of a pair of balls 63, each seating in one of a pair of diametrically opposed cylindrical sockets 64 extending radially through the side wall 65 of the body 54 and closed at their outer ends by a ring or collar 66 slidable over the upper end of the body and releasably held in position thereon by suitable means, such as the illustrated set screw 67. Projecting from the side into the valve chamber 55, the balls 63 ride in an annular or circumferential groove or raceway 68 interrupting the cylindrical side 69 of the stem intermediate its ends and of sufficient vertical or axial extent relative to the position of the balls to accommodate or permit the desired vertical shifting of the stem between fully opened and closed positions. While the washer 60 alone may be relied on for the purpose, it is preferred to seal the valve chamber against escape of fluid about the valve stem by an O-ring or like sealing gasket 70 carried circumferentially by the stem between the washer 60 and the ball-seating groove 68.

For causing the valve stem 58 to shift vertically during part of its rotation, there is provided a valve screw or bolt 71 having an externally threaded shank 72 coaxial or concentric with and threaded from below into the stem. The valve screw 71 is held against rotation, while permitted to shift vertically relative to both the stem 58 and the body 54, preferably by providing it below the stem with a head 73 locked or held against rotation and slidable or ridable vertically in a vertically disposed slideway or cavity 74 within the body between the valve seat 61 and the upper end of the tube 12. Locked against rotation by suitable keying, the head 73 preferably is so locked without obstructing flow of fluid through the cavity 74 past it by making it hex- or like flat-sided and forming the cavity with a multiplicity of flat sides or splines 75 which in number are a multiple of the number of sides on the head, thus locking the head at its corners and providing flow passages therebetween. To facilitate assembly, the cavity 74 may be left open at the bottom for insertion of the valve screw 71 and thereafter closed by a cap 76 forming part of and conveniently fixed, secured or made rigid with the remainder of the body 54 by welding. To enable the body 54 to be lifted or lowered as well as restrained or held against rotation during actuation of the stem 58, there is provided a hand wheel or handle 77 which conveniently is slidable over the lower end of the body and releasably fixed or secured thereto by a set screw or like means 78.

Were its only function to enable rotative movement imparted through the handle 59 to shift the stem 58 into and out of engagement with the valve seat 61, the valve screw 71 would be fixed against vertical as well as rotative movement. However, it here performs, in addition, the very important function of interrelating the control and check valves 42 and 40 so as to enable the control valve, during gauging, to open the check valve and regulate the relative sequence of opening and closing of the two valves. This function is imparted to the valve screw 71 by a tube or valve actuating rod 79 slidable vertically or axially in and of less cross-section or diameter than the bore 49 of the tube 12. Fitting loosely in and extending through the tube 12, the rod 79 carries or has at its upper end a button or cap 80, the upper preferably flat face 81 of which is yieldably or resiliently urged upwardly against or into bearing engagement with the preferably flat underface 82 of the head 73 of the valve screw 71 by a spring 83 surrounding the rod and extending into the reacting against an abutment 84 at the lower end of an enlargement or pocket 85 forming the upper end portion of the tube bore 49.

With its spring 83 normally holding the head 73 of the valve screw 71 against the upper of the shoulders 86 at opposite ends of the cavity 74 and its lower end 87 normally spaced above the preferably flat upper end 88 of the nose portion 46 of the check valve element 45, the rod 79 normally does not interfere with closing of the check valve 40 under force of its spring 48. Nor does it affect the check valve 40 during opening of the control valve 42 in which, with the valve stem 58 free to move upwardly and the valve screw 71 held against downward movement by the spring 83, the stem is rotated or turned on the screw in a direction to shift it upwardly in the valve chamber 55. However, once the valve stem 58 has been shifted upwardly to open position, further upward movement of the stem is prevented by the balls 63 and continued rotation of the stem in the same direction will cause the relative axial movement of the stem and screw 71, consequently upon their threaded engagement, to shift or drive the head 73 of the screw downwardly in its cavity 74 against the resistance of the spring 83, correspondingly shifting the valve rod 79 to the point at which its lower end 87 engages and unseats the check valve element 45 from its seat 47. At this juncture, fluid in the tank 2 is free to pass through the tube assembly 38, entering at the intake slot 39, flowing upwardly through the check and control valves 40 and 42 and the tube 12 therebetween and discharging at the outlet port 41.

Thus, with the control and check valves 42 and 40 operatively connectable by the valve screw 71 and rod 79 so that both valves are opened by actuation of the control valve, the tube assembly 38 in a single gauge installation is enabled, by manually shifting it upwardly or downwardly by the handwheel 77, to sample the fluid content of the tank at any level and, by change of the flow from liquid to gas or vice versa, indicate that its intake slot 39 is at or immediately adjacent the level of the liquid within the tank, and that level is measurable simply by reading the graduation on the scale 33 on the tube 12 at that time at the sight edge 36 of the pointer 34. Conversely, on completion of the desired measurement or sampling, rotation of the stem 58 of the control valve 42 in the opposite direction initially will not shift the stem downwardly, since the head 73 of the valve screw 71 is then intermediate the ends of its cavity 74, but will progressively shift the head upwardly until it engages the shoulder 86 at the upper end of the cavity, in process withdrawing the lower end 87 of the valve rod 79 from the check valve element 45 and enabling the latter to close under force of its spring 48. The valve screw 71 thereafter being held against upward movement, further rotation of the stem 58 in the same direction will shift the stem downwardly to the point at which the control valve is closed. The control valve 42 accordingly opening before and closing after the check valve 40, any residual pressure which otherwise might impede closing of the check valve is automatically bled from the outlet port 41 through the tube 12 and the control valve. Moreover, on closing of the control valve, both valves are closed, providing a double seal against escape of fluid through the valve assembly, except during gauging, as well as enabling the check valve to function alone in sealing the assembly under abnormal conditions, as when the control valve 42 is intentionally removed for repair or replacement or accidentally removed by breakage of the tube 12 above the pointer 34. As a safety measure in case the tube latch 23 is released when the tube assembly 38 is not under manual restraint, a tube stop 89 may be welded to the tube at some convenient point below its graduated scale 33 to limit the extent to which the pressure in the tank can drive the tube upwardly by engagement with the underside of the body 4.

Under normal conditions, that is, when it is not being used in gauging, the tube assembly 38, to protect it from damage, is positioned or shifted downwardly to the extent possible into the tank 2 and accidental release of the tube latch 23 or valving of the tube assembly is prevented by housing these otherwise exposed operating parts. An important aspect of the preferred embodiment of the present invention, the housing 90 for the operating parts is in the form of an assembly including closed top, open-bottomed, preferably cylindrical shell, cover or casing 91, slidable over and adapted to enclose or house the operating parts as well as the cage 19 and seatable at its lower end on a shelf or ledge 92 machined or otherwise conveniently formed in the support plate or housing support 22 mounted on the gauge body 4. Collaring, encircling or embracing and slidable vertically or axially on the shell 91 is a sheath 93 conveniently fitted with handles 94 both for shifting it on the shell and for handling the whole assembly.

Apart from providing the handles 94, the function of the sheath 93 is to actuate locking means 95 for releasably locking the housing assembly 90 to the support plate 22. The locking means 95 are comprised of a plurality of dogs or latches 96 carried by the shell 91 and shiftable into and out of locking engagement with the housing support 22. In the preferred form each of the dogs 96 is generally of rocker shape and has a rocker or arcuately convex face 97 seating in and rockable against a concave surface 98 of a longitudinally or vertically extending portion 99 of an outwardly facing cruciform slot 100 formed in the side wall 101 of the shell 91, the dog rocking or pivoting on trunnions 102 formed integrally with it and received, seating or fitting in the transversely or horizontally directed portion 103 of the slot. Below its slot 100, each has an integral head or hook 104 instanding radially and below the bottom end 105 of the shell 91 and having an upper face 106 adapted to underlie and engage the underside 107 of the support plate 22 which serves as a catch and for this purpose preferably is beveled upwardly toward its rim.

The dogs 96 extending radially outwardly beyond their slots, the lower portion 108 of the sheath 93 is annularly bulged to include, encompass or accommodate them and receives each in a downwardly and inwardly opening pocket, socket or slot 109 restricted over its lower part by an instanding abutment 110, the inner, dog-confronting face 111 of which preferably is substantially straight intermediate its ends and adapted to engage and rub against an arcuate or curved hump 112 on the otherwise concave back 113 of the related dog in lateral alignment with its trunnions 102 so as to hold the latter in the transverse portion 103 of the associated cruciform slot 100. Below its hump-engaging face 111, each abutment 110 has an out-turned, arcuately convex camming face 114 corresponding approximately in contour to and adapted to engage the confronting portion of the concave back 113 for camming, wedging or rocking the dog into locked position on downward movement of the sheath 93 relative to the shell 91. At its opposite or upper end, the abutment 110 has a shoulder 115 engageable with a normally inclined or obliquely disposed outer face or edge 116 of the tail or tail portion 117 of the dog 96, which tail normally lies above the abutment in the relatively deep upper part of the pocket 109, such engagement, on upward movement of the sheath 93 relative to the shell 91, rocking or canting the heads 104 of the dogs outwardly to release or unlock them from the housing support 22.

With the dogs preferably three in number and equally spaced circumferentially of or about the housing 90, the sheath 93 is limited in its downward movement relative to the shell 91 in both applied and removed positions by engagement of its camming surfaces 114 with the backs 113 of the dogs 96. Upward movement of the sheath 93 relative to the shell 91 also is limited, once the housing is assembled, by a housing ring or collar 118 collaring or encircling the shell above the sheath and preferably having a depending skirt or flange 119 overlapping and protecting the upper end portion of the sheath and formed about a downwardly facing stop face 120 on the ring which is engageable with and normally spaced above the upper end 121 sufficiently to accommodate the desired range of upward movement of the sheath relative to the shell.

Secured to the shell 91 by suitable means, such as the illustrated plurality of set screws 122, and preferably provided with an integral outstanding loop 123 through which it and the housing as a whole can be chained against undesired removal to the tank 2, the illustrated housing ring 118 is also adapted to lock the sheath 93 in down position so as to lock the housing against removal. This is here accomplished by pivotally mounting on the ring between ears or pintles 124 integral with and outstanding from the latter, a lock lever 125, the free end of which is lockable, as by a padlock 126, to an apertured lug 127 formed integrally with the ring 118 and spaced circumferentially thereabout from the ears 124. Intermediate the ends and depending from the lower edge of the lock lever 125 is an inturned locking tongue or finger 128 which, in the locked position of the lever, extends or projects inwardly through a cut-out portion 129 of the skirt 119 and overlies and engages the upper end 121 of the sheath 93. Thus adapted to lock the sheath against movement to release the dogs 96, the locking lever also serves to prevent undesired removal of the housing ring 118 from the shell 91 by covering, in locking position, one of the set screws 122 by which the ring is secured in place.

While the stuffing box arrangement for the tube 12 shown in FIGURE 8 with its spring-loaded, chevron-shaped packing rings 14 is more effective than any now in use in slip-tube gauges, and some variation in the sealing pressure applied through the rings is obtainable by screwing the packing nut 17 in or out, as by a turning pin (not shown) fittable into any of the radial drillings 130 in the nut, such variation is of necessity small because of the relatively small change in resistance to compression under loading which is characteristic of coil springs. Consequently, if the pressure in the tank on which the gauge is installed is sufficiently high, some seepage or escape of fluid through the packing may result which, while of no consequence during gauging, is objectionable over an extended period in decreasing the pressure in the tank. The modification shown in FIGURES 16 and 17 effective inhibits seepage about the tube 12, to drain which the housing support 22 of the main embodiment shown in FIGURE 7 is provided with a weep hole 131, and therefore is desirable in particular high pressure installations in which such seepage is a factor. In essence, the modification employs a spring-loaded packing, preferably of the type shown in FIGURE 7, but augments this by sealing means compressed under positive, as opposed to spring, pressure, except during gauging.

Figure 16:
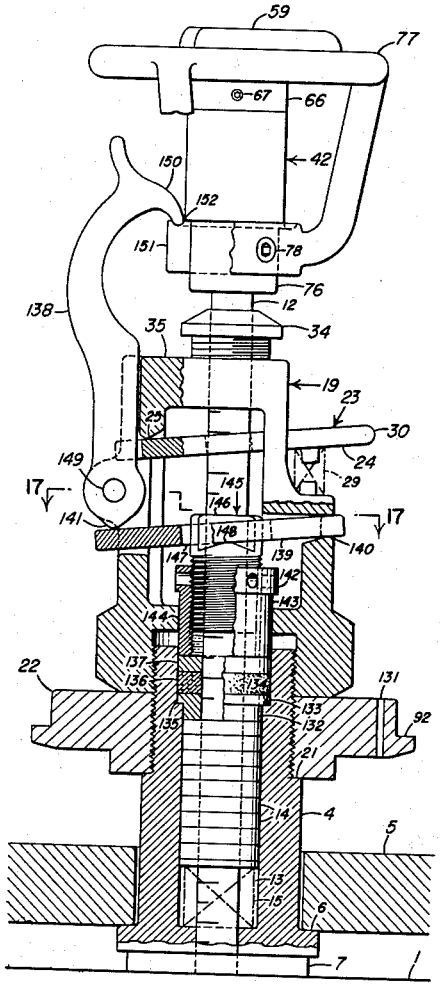
FIGURE 16 is a fragmentary view on a section corresponding to that of FIGURE 7 but a reduced scale, showing the gauge of that figure modified to augment the packing about the tube by a compression seal.
Figure 17:
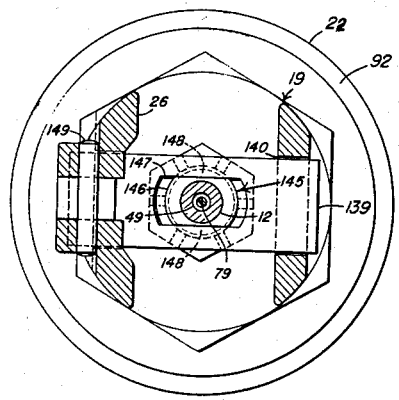
FIGURE 17 is a horizontal sectional view taken along the lines 17—17 of FIGURE 16.
Figure 19:
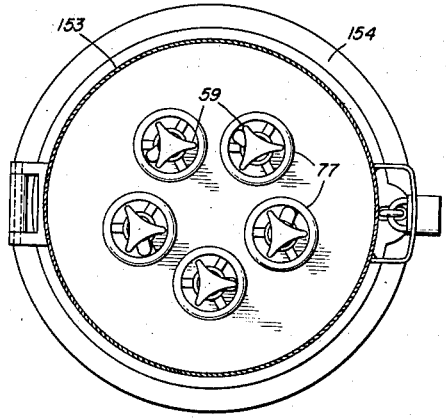
FIGURE 19 is a horizontal sectional view taken along the lines 19—19 of FIGURE 18.

In the form illustrated in FIGURES 16 and 17, the positive compression sealing means which is effective normally or except during gauging to seal against seepage, includes a gland 132 slidable into the cavity 13 in the gauge body 4 about the tube 12 and having at its upper end a radially projecting annular flange 133 received in and seated against the bottom wall 134 of a socket 135 forming the upper portion of the cavity 13. Bearing against the upper end of the spring-loaded packing rings 14 and held or fixed against downward displacement by the engagement of its flange 133 with the bottom wall 134 of the socket 135, the fixed gland 132 supports a compressible seal or washer 136 of soft, pliable or resilient material interposed between it and a superimposed pressure gland 137, the latter being forcible downwardly to expand the washer radially against the body 4 and tube 12 under positive pressure of such order as to inhibit seepage therebetween. Such positive pressure preferably is applied by a camming lever 138 pivotally connected to the cage 19 and acting on the free end of a pressure plate 139, the opposite end of which may be pivoted or fulcrummed in the same manner as the tube latch 23 by being received in an outwardly flaring slot 140 in the cage 19 in the opposite side thereof from that in which the latch slot 25 is formed.

With its lower end, below its pivot and bearing on the pressure plate 139, formed as a cam 141 to increase the pressure applied to the plate as it is swung from horizontal to vertical position, the camming lever 138 applies positive pressure through the pressure plate 139 to the pressure gland 137 by a hex- or like-headed adjusting nut 142 having a cylindrical throat portion 143, the smooth outer surface 144 of which is slidably received in the upper end of the socket 135. Threaded into and projecting above the adjusting nut 142 is a sleeve 145 axially bored to pass the tube 12 and having or carrying about the tube above the nut an upstanding, horizontally elongated boss or knob 146 received in a longitudinally elongated slot 147 in the pressure plate 139 with sufficient end play therebetween to accommodate angling of the plate 139. Centered by the boss 146 and slot 147 relative to the sleeve 145, the pressure plate 139 applies pressure to the sleeve through a pair of ridges or shoulders 148 extending substantially radially of and milled into the unthreaded upper end portion of the sleeve at opposite sides of the boss 146. With the sleeve 145 and adjusting nut 142 thus adjustable or shiftable vertically relative to each other, the positive pressure applicable by the camming lever 138 through the pressure plate 139, the sleeve 145, the adjusting nut 142 and the pressure gland 137 can be adjusted at will to vary the compression of the compressible washer 136 as necessary to seal against seepage between the tube 12 and the gauge body 4.

Conveniently connected to the cage 19 by a pivot pin 149 and with the adjoining side of the cage and end of the tube latch 23 bifurcated to receive it in its vertical or compressing position, the camming lever 138 also may be made to serve as a positive lock against upward movement of the tube 12 in case of accidental release of the tube latch. To enable it to perform this additional function, the camming lever 138 has or carries on its upper end portion an instanding hook 150 and the hub 151 of the handle 77 is enlarged in diameter and provided, on its upper side, with a groove 152 for receiving and engaging the end of the hook.

Figure 18:
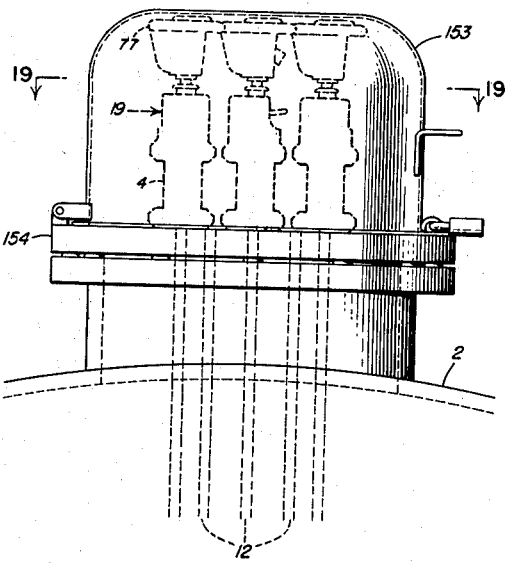
FIGURE 18 is a fragmentary side elevational view showing a multiplicity of the gauges of FIGURE 1 arranged in a so-called "tandem" installation on a deep tank in which the total depth of the tank is divided into a number of portions, each measurable by one of the gauges.

Usually installed one to a tank, the slip tube gauge of this invention may be one of a plurality or multiplicity of like gauges in a plural or multiple tandem installation on a tank too deep for ready gauging by a single gauge. A typical tandem installation is illustrated in FIGURE 18, in which each gauge is designed and has its tube 12 graduated to gauge a predetermined part of the total depth of the tank with sufficient overlap between the gauges for adjoining parts to ensure coverage of the whole depth. With its gauges grouped together in a circular or other suitable arrangement, such an installation may have, instead of the individual housings 90 of single gauge installations a common cover 153 surrounding the gauges and hinged and preferably lockable on appropriate fitting 154 mounted on the tank 2, to both house and prevent tampering with the gauges when not in use.

From the above detailed description, it will be apparent that there has been provided an improved slip tube gauge which, without increase in complexity or cost, is markedly superior to prior gauges. It should be understood that the described and disclosed embodiments are merely exemplary of the invention and that all modifications are intended to be included which do not depart from either the spirit of the invention or the scope of the appended claims.

Having described my invention, I claim:

1. A slip tube gauge for a pressure tank comprising a base sealingly attached to the tank about an opening thereinto, an axially shiftable tube extending vertically through said base and opening into said tank, packing means in said base about said tube, a cage surmounting said base, a tube latch lever pivotally mounted in said cage and having a hole intermediate its ends through which said tube extends, said latch lever in one position freely passing and on relative upward tilting locking said tube against upward movement, spring means for normally holding said latch lever in tube-locking position, pointer means carried by said cage for reading a graduated scale on said tube, upper and lower valve means carried by said tube respectively within said tank and above said cage, said lower valve means being spring-loaded for normally closing an intake port to said tube, said upper valve means including a seat and a valve stem rotatable and shiftable within limits relative to said seat, rod means extending loosely through said tube and operatively connected to and shiftable vertically on rotation of said stem at a limit of movement thereof away from said seat for opening and controlling closing of said lower valve, a housing support carried by said base below said tube latch, a removable housing, said housing including a cover seatable on said support for enclosing therewith operating parts of said gauge thereabove, locking means carried by said cover and shiftable transversely thereof into and out of locking engagement with said support, and actuating means carried by and shiftable vertically relative to said cover for locking and releasing said locking means.

2. A slip tube gauge for a pressure tank comprising a base sealingly attached to said tank about an opening therein, an axially shiftable tube extending vertically through said base and opening into said tank, packing means between said base and tube, normally closed valve means carried by said tube for controlling flow of fluid therethrough, a cage carried by and surmounting said base, a latch lever having an end pivotally connected to said cage and a hole intermediate its ends through which said tube extends, said latch lever in one position freely passing and on relative upward tilting locking said tube against upward movement, spring means acting against said cage and on a free end of said latch lever beyond said hole for normally holding said latch lever in tube locking position, and opposed normally spaced stop means carried by said cage and latch lever and positioning said spring means relative thereto, said stop means stopping said latch lever in said one position under a force opposing said spring means.

3. A slip tube gauge for a pressure tank comprising a base sealingly attached to said tank about an opening therein, an axially shiftable tube extending vertically through said base and opening into said tank, packing means between said base and tube, normally closed valve means carried by said tube for controlling flow of fluid therethrough, a cage carried by and surmounting said base, a latch lever having one end pivotally mounted on said cage and having a hole intermediate its ends through which said tube extends, spring means reacting against said cage and acting upwardly on said latch lever intermediate said hole and a free end thereof for normally holding said latch lever in tube-locking position, a pointer nut threaded into said cage about said tube for vertical adjustment relative thereto and having a sighting edge for reading a graduated scale on said tube, and means for locking said nut against adjustment.

4. A slip tube gauge for a pressure tank comprising a base, support means releasably secured to said base above said tank, a mounting plate releasably securable to said tank and loosely encircling and engageable with abutment means on said base below said support means for sealingly clamping said base to said tank about an opening thereinto, an axially shiftable tube extending vertically through said base and opening into said tank, packing means between said tube and base, normally closed valve means carried by said tube for controlling flow of fluid therethrough, spring-loaded latch means carried by said base above said support means and engageable with said tube for normally locking said tube against upward movement, and housing means releasably connected to and surmounting said support means for enclosing operating parts of said gauge.

5. A slip tube gauge for a pressure tank comprising a tube extending into and slidable vertically relative to said tank, control and check valves connected respectively to upper and lower ends of said tube and opening in opposite directions, yieldable means normally holding said check valve closed, said control valve including a valve seat, a rotatable valve stem shiftable axially relative to said seat, and means movable with said stem for closing said seat, and means extending through said tube and actuated by rotation of said stem after opening of said control valve for opening said check valve.

6. A slip tube gauge for a pressure tank comprising a tube extending into and slidable vertically relative to said tank, control and check valves connected respectively to upper and lower ends of said tube, yieldable means normally holding said check valve closed, said control valve including an upwardly facing valve seat, a rotatable valve stem shiftable axially relative to said seat, and means movable with said stem for closing said seat, and rod means in and shiftable vertically relative to said tube and operatively connected to said stem, said rod means being shiftable downwardly by rotation of said stem after opening of said control valve for opening said check valve.

7. A slip tube gauge for a pressure tank comprising a tube extending into and slidable vertically relative to said tank, control and check valves connected respectively to upper and lower ends of said tube and opening in opposite directions, each of said valves including a valve seat and a valve element seatable therein and shiftable vertically relative thereto, yieldable means normally urging said valve element of said check valve into its seat, a rotatable and vertically shiftable valve stem carrying said valve element of said control valve, means for limiting upward movement of said stem, and rod means extending through said tube and normally spaced from said check valve element, said rod means being operatively connected to and shiftable vertically by rotation of said stem at the upper limit of movement thereof for unseating and subsequently controlling seating of said check valve element.

8. A slip tube gauge for a pressure tank comprising a graduated tube sealingly mounted on and slidable vertically in said tank, said tube having an intake port to a lower end thereof, a check valve connected to said lower end of said tube and normally closing said intake port thereto, a control valve connected to an upper end of said tube, said control valve including a body, a valve chamber in said body, a seat at an end of said chamber, a valve stem rotatable and axially shiftable relative to said seat, means for limiting axial shifting of said stem in a direction away from said seat, rod means in and shiftable axially of said tube and extending into said body, and means interposed between said rod means and stem and operative on rotation of said stem at the limit of axial movement thereof away from said seat for shifting said rod means to open and control closing of said check valve.

9. A slip tube gauge for a pressure tank comprising a graduated tube sealingly mounted on and slidable vertically in said tank, said tube having an intake port to a lower end thereof, a check valve connected to said lower end of said tube and normally closing said intake port thereto, a control valve connected to an upper end of said tube, said control valve including a body, a valve chamber in said body, a seat at an end of said chamber, a valve stem rotatable and axially shiftable relative to said seat, ball means seated on said body and riding in an elongated circumferential groove in said stem for limiting axial movement of said stem in a direction away from said seat, rod means in and shiftable axially of said tube and extending into said body, and means interposed between said rod means and stem and operative on rotation of said stem at the limit of axial movement thereof away from said seat for shifting said rod means to open and control closing of said check valve.

10. A slip tube gauge for a pressure tank comprising a graduated tube sealingly mounted on and slidable vertically in said tank, said tube having an intake port to a lower end thereof, a check valve connected to said lower end of said tube and normally closing said intake port thereto, a control valve connected to an upper end of said tube, said control valve including a body, a valve chamber in said body, a seat at an end of said chamber, a valve stem rotatable and axially shiftable relative to said seat, a plurality of circumferentially spaced cylindrical sockets extending radially through a side of said body and opening onto a side of said chamber, ring means releasably secured to said body for closing outer ends of said sockets, an elongated circumferential groove in said stem, a ball seated in each of said sockets and riding in said groove in said stem for limiting movement of said stem in a direction away from said seat, rod means in and shiftable axially of said tube and extending into said body, screw means non-rotatably seated in and shiftable axially of said body, said screw means threadedly engaging said stem and engaging said rod means, and means yieldably resisting downward movement of said screw means and rod, said screw means on rotation of said stem at the limit of axial movement thereof away from said seat acting through said rod means for opening and controlling closing of said check valve.

11. A slip tube gauge for a pressure tank comprising a graduated tube sealingly mounted on and slidable vertically in said tank, said tube having an intake port to a lower end thereof, a check valve connected to said lower end of said tube and normally closing said intake port thereto, a control valve connected to an upper end of said tube, said control valve including a body, a valve chamber in and opening onto an upper end of said body and coaxial with said tube, a valve seat in said body at an inner end of said chamber, a valve stem rotatable and axially shiftable in said chamber, means movable with said stem for closing said seat, means for limiting upward movement of said stem relative to said seat, a vertically extending cavity in said body between said seat and the upper end of said tube, a valve screw having a shank threaded into said stem and a head slidable vertically in and keyed against rotative movement relative to said cavity, a rod extending loosely through said tube and projecting into said cavity, spring means acting upwardly on said rod for urging the upper end thereof against said head, and handle means on each of said body and stem for movement thereof relatively and in unison, said screw on rotation of said stem at the limit of upward movement thereof relative to said body shifting said rod vertically in said tube for opening and controlling closing of said check valve.

12. A slip tube gauge for a pressure tank comprising a graduated tube sealingly mounted on and slidable vertically in said tank, said tube having an intake port to a lower end thereof, a check valve connected to said lower end of said tube and normally closing said intake port thereto, a control valve connected to an upper end of said tube, said control valve including a body, a valve chamber in and opening onto an upper end of said body and coaxial with said tube, a valve seat in said body at an inner end of said chamber, a valve stem rotatable and axially shiftable in said chamber, means movable with said stem for closing said seat, means for limiting upward movement of said stem relative to said seat, a vertically extending cavity in said body between said seat and the upper end of said tube, a valve screw having a shank threaded into said stem and a head slidable vertically in said cavity, said head and cavity being multi-sided with the number of sides on said cavity a multiple of the number of sides of said head for locking said head against rotation while permitting flow of fluid therepast through said cavity.

13. In a slip tube gauge for a pressure tank having a base sealingly attachable to said tank about an opening therein, an axially shiftable tube extending vertically through said base and opening into said tank, control valve means carried by said tube above said base for controlling flow of fluid therethrough, and latch means for normally locking said tube against upward movement, the combination of a housing support carried by said base, and a removable housing, said housing including a casing supportable on said support for enclosing therewith said valve and latch means, a plurality of dogs carried by and projecting below said casing and rockable substantially vertically thereon into and out of locking engagement with said support, actuating means normally engaging and encircling and shiftable vertically relative to said casing for rocking said dogs into and out of locking position, and means releasably attached to said casing above and engageable with said actuating means for limiting upward movement thereof relative to said casing, said actuating means on detachment of said limiting means being disengageable from said dogs.

14. In a slip tube gauge for a pressure tank having a base sealingly attachable to said tank about an opening therein, an axially shiftable tube extending vertically through said base and opening into said tank, control valve means carried by said tube above said base for controlling flow of fluid therethrough and latch means for normally locking said tube against upward movement, the combination of a housing support carried by said base above said tank, and a removable housing, said housing including a casing supportable on said support and enclosing therewith said valve and latch means, a plurality of dogs carried by and circumferentially spaced about said casing and projecting therebelow for locking engagement with an underside of said support, a sheath encircling and shiftable vertically on said casing, said dogs being rockable substantially vertically on said casing into and out of locking engagement with said support, said sheath normally engaging and partly enclosing and on vertical shifting acting on said dogs for rocking said dogs into and out of locking engagement with said support, and means releasably attached to said casing above and engageable with said sheath for limiting upward movement thereof relative to said casing, said actuating means on detachment of said limiting means being disengageable from said dogs.

15. In a slip tube gauge for a pressure tank having a base sealingly attachable to said tank about an opening therein, an axially shiftable tube extending vertically through said base and opening into said tank, control valve means carried by said tube above said base for controlling flow of fluid therethrough, and latch means for normally locking said tube against upward movement, the combination of a housing support carried by said base and a removable housing, said housing including a casing supportable on said support and enclosing therewith said valve and latch means, a plurality of outwardly facing cruciform slots spaced circumferentially about a side of said casing adjacent a lower end thereof, a dog for each of said slots, each dog having a rocker face rockable in a vertically extending portion and trunnions seating in a transverse portion of the related slot, a sheath encircling and shiftable vertically relative to said casing and having a pocket for receiving each of said dogs, each of said dogs having a head portion projecting below said casing and lockingly engageable on rocking thereof with an underside of said support, abutment means in each of said pockets and engageable with the associated dog for rocking said dogs into and out of locking engagement with said support on vertical movement of said sheath relative to said casing, and means carried by said casing and engageable with said sheath for limiting upward movement thereof relative to said casing.

16. In a slip tube gauge for a pressure tank having a base sealingly attachable to said tank about an opening therein, an axially shiftable tube extending vertically through said base and opening into said tank, control valve means carried by said tube above said base for controlling flow of fluid therethrough and spring-loaded latch means for normally locking said tube against upward movement, the combination of a housing support carried by said base, and a removable housing, said housing including a casing supportable on said support and enclosing therewith said valve and latch means, a plurality of dogs carried by and circumferentially spaced about said casing and projecting therebelow for locking engagement with said support, a sheath encircling and shiftable vertically on said casing, said dogs being rockable substantially vertically on said housing into and out of locking engagement with said support, said sheath partly enclosing and on vertical shifting acting on said dogs for rocking said dogs into and out of said locking engagement with said support, a ring collaring said casing above said sheath and having a downwardly facing stop face normally spaced from and engageable with an upper end of said sheath for limiting upward movement thereof relative to said casing, a lever pivotally mounted on and having a free end lockable to said ring, means carried by said lever and engageable in the locked position thereof with said upper end of said casing for locking said casing against upward movement, and means for releasably securing said ring to said casing, at least one of said securing means being covered by said lever on locking of said free end thereof to said housing.

17. In a slip tube gauge for a pressure tank having a base sealingly attachable to said tank about an opening therein, an axially shiftable tube extending vertically through said base and opening into said tank, control valve means carried by said tube above said base for controlling flow of fluid therethrough, and spring-loaded latch means for normally locking said tube against upward movement, the combination of a housing support carried by said base, and a removable housing, said housing including a casing supportable on said support and enclosing therewith said valve and latch means, a plurality of dogs carried by and circumferentially spaced about said casing and projecting therebelow for locking engagement with said support, a sheath encircling and shiftable vertically on said casing, said dogs being rockable substantially vertically on said housing into and out of locking engagement with said support, said sheath partly enclosing and on vertical shifting acting on said dogs for rocking said dogs into and out of said locking engagement with said support, a ring collaring said casing above said sheath and having a downwardly facing stop face normally spaced from and engageable with an upper end of said sheath for limiting upward movement thereof relative to said casing, a lever pivotally mounted for horizontal swinging on and having a free end lockable to said ring, finger means carried by and instanding from said lever intermediate ends thereof and engageable in said locked position with said upper end of said casing for locking said casing against upward movement, and means for releasably securing said ring to said casing, at least one of said securing means being covered by said lever on locking of said free end thereof to said housing.

18. In a slip tube gauge for a pressure tank having a base sealingly attachable to said tank about an opening therein, an axially shiftable tube extending vertically through said base and opening into said tank, control valve means carried by said tube above said base for controlling flow of fluid therethrough, and spring-loaded latch means for normally locking said tube against upward movement, the combination of a housing support carried by said base, and a removable housing, said housing including a casing supportable on said support and enclosing therewith said valve and latch means, a plurality of dogs carried by and circumferentially spaced about said casing and projecting therebelow for locking engagement with said support, a sheath encircling and shiftable vertically on said casing, said dogs being rockable substantially vertically on said housing into and out of locking engagement with said support, said sheath partly enclosing and on vertical shifting acting on said dogs for rocking said dogs into and out of said locking engagement with said support, a ring collaring said casing above said sheath and having a downwardly facing stop face normally spaced from and engageable with an upper end of said sheath for limiting upward movement thereof relative to said casing, a depending skirt on said ring about said face and vertically overlapping said upper end of said sheath, a lever pivotally mounted for horizontal swinging on and having a free end lockable to said ring, a finger carried by and instanding from said lever and in the locked position thereof extending through said skirt between said stop face and upper end for locking said sheath against upward movement, and means for releasably securing said ring to said casing at least one of which is covered by said lever in the locked position thereof.

19. In a slip tube gauge for a pressure tank having a base sealingly attachable to said tank about an opening thereinto, and an axially shiftable tube extending vertically through said base and opening into said tank, the combination of a cavity in said base about said tube, spring-loaded packing means in said cavity below an upper end thereof, a gland in and limited in downward movement relative to said cavity and engaging an upper end of said packing means, a pressure gland about and shiftable axially relative to said tube above said first-named gland, compressible sealing means interposed between said glands, and means for applying variable positive pressure to said pressure gland for adjusting the compression of said sealing means between said glands.

20. In a slip tube gauge for a pressure tank having a base sealingly attachable to said tank about an opening thereinto, and an axially shiftable tube extending vertically through said base and opening into said tank, the combination of a cavity in said base about said tube, spring-loaded packing means in said cavity below an upper end thereof, a gland in and limited in downward movement relative to said cavity and engaging an upper end of said packing means, a pressure gland about and shiftable axially relative to said tube above said first-named gland, compressible sealing means interposed between said glands, a pressure plate carried by said base above said pressure gland, lever means carried by said base and acting through said plate for applying positive downward pressure on said pressure gland, and means for adjusting the pressure applied by said lever means.

21. In a slip tube gauge for a pressure tank having a base sealingly attachable to said tank about an opening thereinto, and an axially shiftable tube extending vertically through said base and opening into said tank, the combination of a cavity in said base about said tube, spring-loaded packing means in said cavity below an upper end thereof, a gland in and limited in downward movement relative to said cavity and engaging an upper end of said packing means, a pressure gland about and shiftable axially relative to said tube above said first-named gland, compressible sealing means interposed between said glands, a cage connected to and upstanding from said base about said tube, a pressure plate pivotally mounted at one end to said cage and disposed to act downwardly on said pressure gland, lever means engageable with a free end portion of said plate for applying downward pressure therethrough to said pressure gland, and means for adjusting the pressure applied by said lever to said pressure gland and therethrough to said sealing means.

22. In a slip tube gauge for a pressure tank having a base sealingly attachable to said tank about an opening thereinto, and an axially shiftable tube extending vertically through said base and opening into said tank, the combination of a cavity in said base about said tube, spring-loaded packing means in said cavity below an upper end thereof, a gland in and limited in downward movement relative to said cavity and engaging an upper end of said packing means, a pressure gland about and shiftable axially relative to said tube above said first-named gland, compressible sealing means between said glands, a cage connected to and upstanding from said base about said tube, a pressure plate pivotally mounted at one end to said cage and disposed to act downwardly on said pressure gland, lever means engageable with a free end portion of said plate for applying downward pressure therethrough to said pressure gland, means for adjusting the pressure applied by said lever to said pressure gland and therethrough to said washer means, and hook means carried by said lever and engageable in a pressure applying position thereof with means carried by said tube for locking said tube against upward movement.

23. In a slip tube gauge for a pressure tank having a base sealingly attachable to said tank about an opening thereinto and an axially shiftable tube extending vertically through said base and opening into said tank, the combination of a cavity in said base about said tube, spring-loaded packing means in said cavity below an upper end thereof, a gland in and limited in downward movement relative to said cavity and engaging an upper end of said packing means, a pressure gland about and shiftable axially relative to said tube above said first-named gland, compressible sealing means between said glands, a cage connected to and upstanding from said base about said tube, a pressure plate pivotally mounted at one end to said cage and disposed to act downwardly on said pressure gland, lever means engageable with a free end portion of said plate for applying downward pressure therethrough to said pressure gland, and means interposed between said pressure plate and gland, said means being threaded into and adjustable axially relative to said pressure gland for adjusting the pressure applied therethrough on said sealing means by said lever and plate.

References Cited in the file of this patent

UNITED STATES PATENTS

| | | |
|---|---|---|
| 1,136,606 | Loyd et al. | Apr. 20, 1915 |
| 2,090,514 | Folmsbee | Aug. 17, 1937 |
| 2,267,221 | Roney | Dec. 23, 1941 |
| 2,336,428 | Watson | Dec. 7, 1943 |
| 2,361,872 | Rodgers | Oct. 31, 1944 |
| 2,404,087 | Parsons | July 16, 1946 |
| 2,635,903 | Hanson | Apr. 21, 1953 |

FOREIGN PATENTS

| | | |
|---|---|---|
| 310,547 | Germany | Jan. 29, 1919 |